United States Patent
Wang

(10) Patent No.: US 9,460,463 B2
(45) Date of Patent: Oct. 4, 2016

(54) METHOD, WEB SERVER AND WEB BROWSER OF PROVIDING INFORMATION

(71) Applicant: Alibaba Group Holding Limited, Grand Cayman (KY)

(72) Inventor: Mei Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 680 days.

(21) Appl. No.: 13/862,066

(22) Filed: Apr. 12, 2013

(65) Prior Publication Data

US 2013/0275270 A1    Oct. 17, 2013

(30) Foreign Application Priority Data

Apr. 13, 2012    (CN) .......................... 2012 1 0109427

(51) Int. Cl.
*G06Q 30/02*    (2012.01)
*G06Q 30/06*    (2012.01)

(52) U.S. Cl.
CPC .......... *G06Q 30/0625* (2013.01); *G06Q 30/02* (2013.01); *G06Q 30/0623* (2013.01); *G06Q 30/0631* (2013.01); *G06Q 30/0255* (2013.01); *G06Q 30/0256* (2013.01)

(58) Field of Classification Search
CPC .................... G06Q 30/0251; G06Q 30/0255; G06Q 30/0256; G06Q 30/0623; G06Q 30/0625; G06Q 30/0631
USPC ......... 705/14.49, 14.53, 14.54, 26.61, 26.62, 705/27.1
See application file for complete search history.

(56) References Cited

U.S. PATENT DOCUMENTS

| | | | | |
|---|---|---|---|---|
| 6,317,722 B1* | 11/2001 | Jacobi | .................... | G06Q 30/02 705/14.51 |
| 6,912,505 B2* | 6/2005 | Linden | .................... | G06Q 30/02 705/14.53 |
| 7,346,559 B2* | 3/2008 | Kraft | ..................... | G06Q 30/02 705/26.62 |
| 7,590,562 B2* | 9/2009 | Stoppelman | ...... | G06F 17/30994 705/26.7 |
| 7,720,723 B2* | 5/2010 | Dicker | .................. | G06Q 30/02 705/14.51 |
| 7,949,573 B1* | 5/2011 | Cohen | .................... | G06Q 30/02 705/14.54 |

(Continued)

OTHER PUBLICATIONS

Schafer, J.B. et al., "E-Commerce Recommendation Applications," Data Mining and Knowledge Discovery, 5, pp. 115-153, Kluwer Academic Publishers, 2001.*

(Continued)

*Primary Examiner* — Nicholas D Rosen
(74) *Attorney, Agent, or Firm* — Lee & Hayes, PLLC

(57) ABSTRACT

The present disclosure discloses a method, a web server and a web browser of providing information. The method of providing information includes: in response to receiving a webpage access request of a user, obtaining, by a web server, attribute information of second product information that matches with first product information corresponding to a webpage which the user requests to browse; finding second product information which satisfies the attribute information; and sending the found second product information to a web browser used by the user in order for the webpage browser to include the received second product information in the webpage for provision to the user. The technical scheme of the present disclosure solves the problem of repeatedly performing actions (such as searching, clicking, browsing, etc.) by a user in an electronic commerce website and thereby wasting a relatively large amount of processing resources of the electronic commerce website under existing technologies.

20 Claims, 4 Drawing Sheets

(56) References Cited

U.S. PATENT DOCUMENTS

| | | | |
|---|---|---|---|
| 8,205,158 B2* | 6/2012 | Ganz | G06Q 30/0643 |
| | | | 715/706 |
| 8,244,564 B2* | 8/2012 | Selinger | G06Q 30/02 |
| | | | 705/7.11 |
| 9,047,610 B1* | 6/2015 | Nayfeh | G06Q 30/02 |
| 2002/0019763 A1* | 2/2002 | Linden | G06Q 30/02 |
| | | | 705/14.53 |
| 2002/0065744 A1* | 5/2002 | Collins | G06Q 30/06 |
| | | | 705/26.64 |
| 2002/0156686 A1* | 10/2002 | Kraft | G06Q 30/02 |
| | | | 705/26.62 |
| 2003/0105682 A1* | 6/2003 | Dicker | G06Q 30/02 |
| | | | 705/26.8 |
| 2006/0036510 A1* | 2/2006 | Westphal | G06Q 30/02 |
| | | | 705/26.62 |
| 2007/0005437 A1* | 1/2007 | Stoppelman | G06F 17/30994 |
| | | | 705/14.53 |
| 2008/0033939 A1 | 2/2008 | Khandelwal | |
| 2008/0163055 A1* | 7/2008 | Ganz | G06Q 30/0643 |
| | | | 715/706 |
| 2010/0042469 A1 | 2/2010 | Chandrasekar et al. | |
| 2010/0250336 A1* | 9/2010 | Selinger | G06Q 30/02 |
| | | | 705/26.7 |
| 2011/0131101 A1 | 6/2011 | Danish et al. | |
| 2012/0005044 A1 | 1/2012 | Coleman | |
| 2012/0117072 A1 | 5/2012 | Gokturk et al. | |
| 2012/0226698 A1 | 9/2012 | Silvestre et al. | |
| 2012/0246028 A1 | 9/2012 | Xu et al. | |
| 2013/0054551 A1 | 2/2013 | Lange | |
| 2013/0066914 A1 | 3/2013 | Chetuparambil et al. | |
| 2013/0104063 A1 | 4/2013 | Legris | |
| 2014/0108919 A1* | 4/2014 | Numazu | G06Q 30/02 |
| | | | 715/234 |

OTHER PUBLICATIONS

The PCT Search Report and Written Opinion mailed Sep. 30, 2013 for PCT application No. PCT/US13/36412, 8 pages.

Translated Chinese Office Action mailed Dec. 28, 2015 for Chinese patent application No. 20120109427.6, a counterpart foreign application of U.S. Appl. No. 13/862,066, 31 pages.

Xu Qing, Product Recommendation Model Study in B2C E-commerce [J.] China Master Dissertations Full-text Database Information Special. 2010, 02(2): 26-27, translated, 6 pages.

* cited by examiner

METHOD, WEB SERVER AND WEB BROWSER OF PROVIDING INFORMATION

CROSS REFERENCE TO RELATED PATENT APPLICATIONS

This application claims foreign priority to Chinese Patent Application No. 201210109427.6 filed on 13 Apr. 2012, entitled "Method, Web Server And Web Browser of Providing Information," which is hereby incorporated by reference in its entirety.

TECHNICAL FIELD

The present disclosure relates to the field of Internet information processing technologies and particularly, relates to methods, web servers and web browsers of providing information.

BACKGROUND

Electronic commerce websites provide a user with product information of products that can be traded online. The user may buy a product through a fund settlement system provided by the electronic commerce website. The electronic commerce website sends the product that has been bought by the user to the user using a logistics delivery system. This greatly improves the shopping convenience of the user.

A user may browse product information of products in an electronic commerce website through a web browser. When the user wants to buy a product, he/she may be interested not only in product information of the product but also in product information of some other products that match with the product. In that case, the user needs to repeat a search for the product information of the other products that match with the product within the massive volume of product information of the electronic commerce website. For example, the user may want to buy a mobile phone in the electronic commerce website. The user may also want to buy products such as a mobile phone case and a mobile phone screen protector that match with the mobile phone. In that case, the user needs not only to browse product information corresponding to the mobile phone but also to search for product information of the products such as the mobile phone case and the mobile phone screen protector that match with the mobile phone within the electronic commerce website. For another example, the user may want to buy a blue sweater and products such as an outerwear and a scarf that match with this sweater in the electronic commerce website. In that case, the user needs not only to browse product information corresponding to the sweater but also to search for product information of the products such as the outerwear and the scarf that match with the sweater in the electronic commerce website.

As described above, existing technologies require a user to manually search for product information of other products that match with a certain product within the massive volume of product information of an electronic commerce website. As such, the user may repeatedly perform actions such as searching, clicking, browsing, etc., in the electronic commerce website, thereby wasting a relatively large amount of processing resources of the electronic commerce website.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present disclosure provide a method, a web server and a web browser of information provision in order to solve the problem of repeatedly performing actions (such as searching, clicking, browsing, etc.) by a user in an electronic commerce website and thereby wasting a relatively large amount of processing resources of the electronic commerce website under existing technologies.

The following describes a technical scheme of the embodiments of the present disclosure.

An information provision method includes: in response to receiving a webpage access request of a user, obtaining, by a web server, attribute information of second product information that matches with first product information corresponding to a webpage which the user requests to browse; finding second product information which satisfies the attribute information; and sending the found second product information to a web browser used by the user in order for the webpage browser to include the received second product information in the webpage for provision to the user.

A web server includes: a webpage access request receiving unit used for receiving a webpage access request of a user; an attribute information acquisition unit used for obtaining, after the webpage access request receiving unit receives the webpage access request of the user, attribute information of second product information that matches with first product information corresponding to a webpage which the user requests to browse; an information searching unit used for finding second product information that satisfies the attribute information obtained by the attribute information acquisition unit; and an information sending unit used for sending the second product information found by the information searching unit to a web browser used by the user.

A web browser includes: an information receiving unit used for receiving attribute information from a web server that corresponds to a webpage which the user requests to browse, the attribute information being attribute information of second product information that matches with first product information corresponding to the webpage; and an information provision unit used for including second product information received by the information receiving unit in the webpage for provision to the user.

In the technical scheme of the embodiments of the present disclosure, after receiving a webpage access request of a user, the web server first obtains attribute information of second product information which matches with first product information corresponding to a webpage which the user requests to browse, and then finds second product information that satisfies the attribute information, and sends the found second product information to a web browser used by the user in order for the webpage browser to include the received second product information in the webpage for provision to the user. As described above, when the user browses product information of a certain product, he/she does not need to manually search for product information of other products that match with the product within the tremendous volume of product information of an electronic commerce website, if the user wants to browse the product information of the other products that match with the product. Rather, the product information is found and sent by the web server to the web browser, which includes the found product information of the other products that match with the product in the webpage for provision to the user. The user is prevented from repeatedly performing actions such as searching, clicking, browsing, etc., in the electronic commerce website, thus effectively saving a relatively larger amount of processing resources of the electronic commerce website.

DETAILED DESCRIPTION

Figure 1:
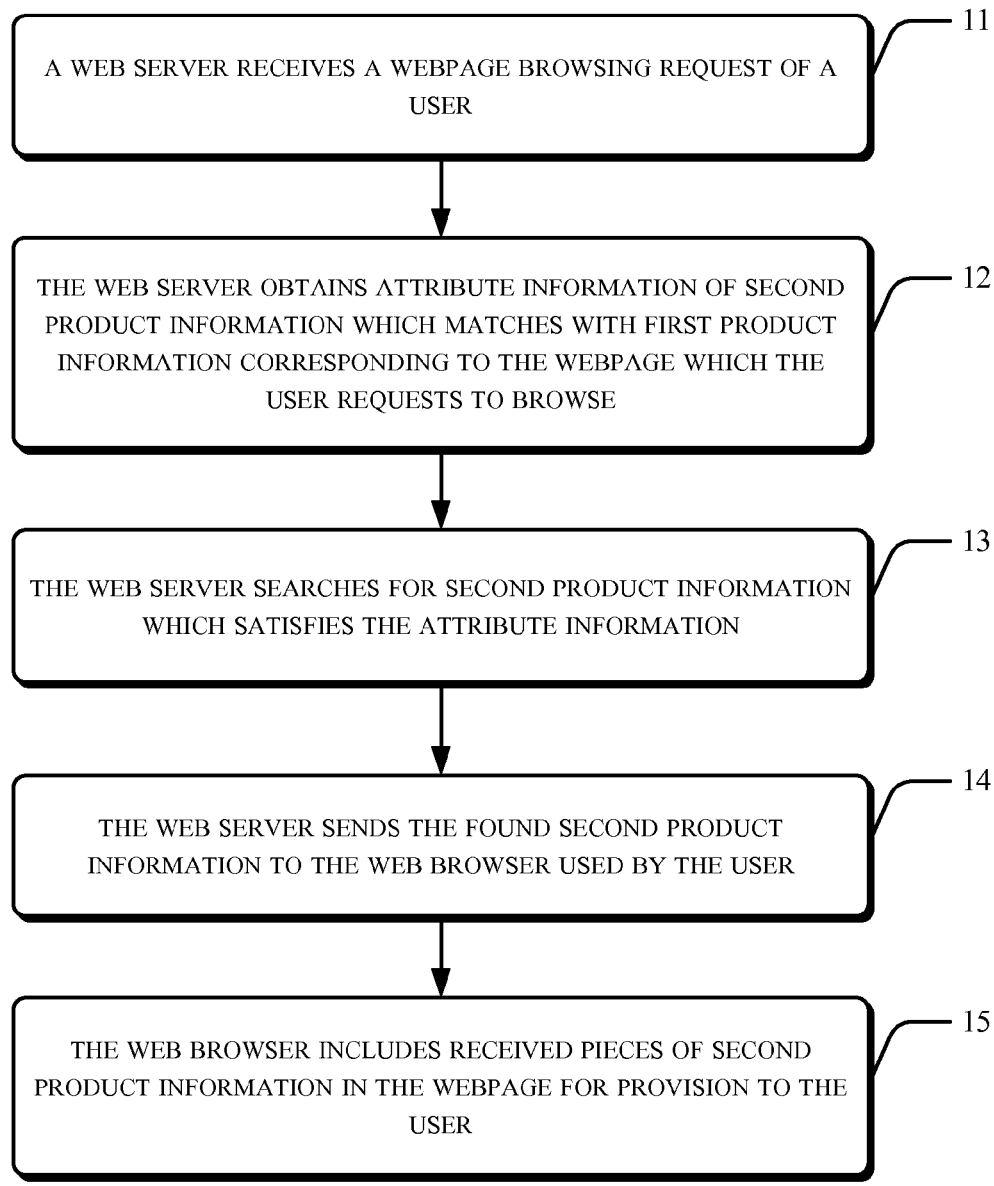
FIG. 1 is a flowchart illustrating a method of providing information in accordance with a second embodiment of the present disclosure.

Main implementation principles, specific implementation methods, and achieved beneficial effects of the technical scheme of the exemplary embodiments of the present disclosure will be described in detail hereinafter in conjunction with the accompanying figures.

The exemplary embodiments of the present disclosure include an offline process of adding attribute information of second product information which matches with first product information, and an online process of providing a user with the second product information which matches with the first product information. The offline process of adding attribute information of second product information which matches with first product information will be described as follows first.

First Embodiment

When publishing product information in an electronic commerce website, a provider user of the product information may add, for this product information, attribute information of other product information that matches with the product information. As such, the other product information that matches with the product information is needed to satisfy the attribute information that has been added by the provider user.

The first embodiment of the present disclosure proposes that the electronic commerce website selects a number of preset attributes from attributes of product information in advance, with each preset attribute corresponding to multiple attribute values. When the provider user of the product information publishes the product information, attribute identifiers of selected preset attributes and corresponding attribute values are presented to the provider user. For each preset attribute, the provider user separately selects at least one attribute value from the attribute values of that preset attribute.

The preset attribute may include, but is not limited to, at least one of the following attributes:

1. Provider User Attribute of Product Information:

This attribute defines a provider user of product information. When publishing the product information, the provider user may select to find matched product information from product information that has been provided by himself/herself for subsequent operations. In this case, the provider user may select an attribute value indicating that "published product information and matched product information belongs to a same provider user". If the provider user selects to find matched product information from all product information of the electronic commerce website for subsequent operations when publishing the product information thereof, the provider user may select an attribute value indicating that "there is no limitation on a provider user who provides matched product information".

2. Category Attribute of Product Information

In an electronic commerce website, product categories may contain root categories and subcategories under each of the root categories. For example, root categories of an electronic commerce website may include "clothing", "handbags and accessories", "digital and home appliances", "beauty and hairdressing", etc. First level subcategories under the root category "clothing" may include "women's clothing", "men's clothing", "kids' clothing", etc. First level subcategories under the root category "handbags and accessories" may include "handbags", "accessories", "jewelry", etc. Second level categories under the first level subcategory "women's clothing" may include "tops", "pants", "skirts", etc. Each product in the electronic commerce website corresponds to at least one category. For example, a certain product may correspond to the root category "clothing", the first level subcategory "women's clothing" under the root category "clothing", and the second level subcategory "tops" under the first level subcategory "women's clothing".

In the first embodiment of the present disclosure, attributes of product information for each level category are collectively referred to as category attributes of the product information. Each category attribute corresponds to at least one attribute value. For example, attribute values of a category attribute of a root category may include "clothing", "handbags and accessories", "digital and home appliances", "beauty and hairdressing", etc. Attribute values of a category attribute of a first level subcategory may include "women's clothing", "men's clothing", "kids' clothing", etc.

3. Product Tag Attribute of Product Information

In an electronic commerce website, each piece of product information corresponds to at least one product tag, such as "target user tag", "style tag", "color tag", etc. Each Product tag attribute corresponds to at least one attribute value. For example, attribute values of "target user tag" may include "men" and "women", and attribute values of "style tag" may include "Korean version", "Western style", etc.

The first embodiment of the present disclosure proposes that correspondence relationships between attribute identifiers of preset attributes and attribute values selected for the preset attributes by a provider user may be used as attribute information of other product information that matches with published product information. If the provider user confirms to publish the product information, the electronic commerce website publishes the product information therein, and at the same time, stores information identifiers of the product information and attribute information of the other product information that matches with the published product information, i.e., storing a correspondence relationship among an information identifier of the product information, an attribute identifier of a preset attribute and an attribute value selected by the provider user.

The information identifier of product information may include, but is not limited to, a Standard Product Unit (SPU) value.

Additionally, when publishing the product information, the provider user may select a plurality of attribute values for each preset attribute, which may be used as selectable attribute values for that preset attribute. A user who subsequently browses the product information may select an attribute value of other product information which matches with the product information from the selectable attribute values in real time. In this case, if the provider user confirms to publish the product information, the electronic commerce website publishes the product information therein, and at the same time, stores a correspondence relationship among the information identifier of the product information, the attribute identifier of the preset attribute and the selectable attribute values that have been selected by the provider user.

In the first embodiment of the present disclosure, when publishing product information, the provider user of the product information may also set a matching promotion rule in advance, i.e., discount information when a user buys the published product information and matched product information at one time. The web server stores the matching promotion rule (that has been set) correspondingly with the information identifier of the product information.

Second Embodiment

The online process of providing a user with second product information which matches with first product information will be described below.

FIG. 1 shows a flowchart illustrating a method of providing information in accordance with the second embodiment of the present disclosure. The process may include the following:

At block 11, a web server receives a webpage access request of a user.

When desiring to browse a webpage using a web browser, a user clicks on an address of the webpage that is desired to be browsed. The web browser includes the address of that webpage into a webpage access request to be sent to a web server corresponding to that webpage.

At block 12, the web server obtains attribute information of second product information which matches with first product information corresponding to the webpage which the user requests to browse.

In the second embodiment of the disclosure, the web server may obtain attribute information of second product information which matches with first product information corresponding to the webpage which the user requests to browse using methods including, but not limited to the following four methods:

A first acquisition method: when desiring to browse a webpage using a web browser, a user clicks on an address of the webpage that is desired to be browsed. The web browser includes the address of that webpage into a webpage access request to be sent to a web server corresponding to that webpage. The web server finds a corresponding webpage from a webpage content provision server according to the address information included in the webpage access request, extracts, from the address information included in the webpage access request, an information identifier of first product information corresponding to the webpage which the user requests to browse, and searches for attribute information of second product information which matches with the first product information from pre-stored correspondence relationships between information identifiers and attribute information based on the extracted information identifier of the first product information.

A second acquisition method: a user of the electronic commerce website may set in advance whether to present matching information when browsing product information.

If the user has previously set up that other product information which matches with the product information is to be presented while browsing the product information, user information of the user in the electronic commerce website may include an instruction for matched presentation. When desiring to browse a webpage using a web browser, the user clicks on an address of the webpage that is desired for browsing. The web browser includes the address of that webpage into a webpage access request to be sent to a web server corresponding to that webpage. The web server finds a corresponding webpage from the webpage content provision server according to the address information included in the webpage access request, obtains the user information of the user, and determines whether the obtained user information includes an instruction for matched presentation. If a determination result is affirmative, the web server confirms that the user wants to browse the second product information which matches with the first product information. In this case, the web server extracts, from the address information included in the webpage access request, the information identifier of the first product information corresponding to the webpage which the user requests to browse, and searches for the attribute information of the second product information which matches with the first product information from the pre-stored correspondence relationships between the information identifiers and the attribute information based on the extracted information identifier of the first product information.

In the first acquisition method and the second acquisition method, after receiving the webpage access request of the user, the web server may first find the webpage which the user requests to browse based on the address information included in the webpage access request, and then search for the attribute information of the second product information which matches with the first product information. Alternatively, the web server may first search for the attribute information of the second product information which matches with the first product information, and then find the webpage which the user requests to browse. There is no limitation on an order of flow between finding the webpage and searching for the attribute information.

A third acquisition method: when desiring to browse a webpage using a web browser, a user clicks on an address of the webpage that is desired for browsing. The web browser includes the address of that webpage into a webpage access request to be sent to a web server corresponding to that webpage. The web server finds a corresponding webpage from the webpage content provision server according to the address information included in the webpage access request. The web server sends the found webpage to the web browser used by the user. The web browser provides the webpage sent from the web server to the user. Thereafter, when determining that second product information which matches with first product information corresponding to the webpage is needed to be presented to the user, the web browser extracts, from the address information of the webpage, an information identifier of the first product information corresponding to the webpage, and includes the extracted information identifier of the first product information into a matching request to be sent to the web server. Upon receiving the matching request from the web browser, the web server searches for attribute information of the second product information which matches with the first product information from the pre-stored correspondence relationships between the information identification and the attribute information based on the information identifier included in the matching request.

A fourth acquisition method: when publishing first product information, a provider user of the first product information may separately select a plurality of attribute values for each preset attribute to be selectable attribute values for that preset attribute. Thereafter, a user who browses the first product information may select an attribute value of second product information which matches with the first product information from the plurality of attribute values of each preset attribute in real time. Specifically, when browsing a webpage using a web browser, the user clicks on an address of the webpage that is desired to be browsed. The web browser includes the address information in a webpage access request to be sent to a web server corresponding to the webpage. The web server finds the corresponding webpage in the webpage content provision server based on the address information included in the webpage access request, and sends the found webpage to the web browser that is used by the user. The web browser provides the webpage that is sent from the web server to the user. Thereafter, when determining that second product information which matches with first product information corresponding to the webpage is needed to be presented to the user, the web browser extracts, from the address information of the webpage, an information identifier of the first product information corresponding to the webpage, and includes the extracted information identifier of the first product information in a matching request to be sent to the web server. After receiving the matching request from the web browser, the web server searches for attribute identifiers of each preset attribute and (previously selected) selectable attribute values of the second product information which matches with first product information from pre-stored correspondence relationships among the information identifiers, the attribute identifiers of the preset attributes and the selectable attribute values of the preset attributes based on the information identifier included in the matching request. The web server sends the found attribute identifiers and the selectable attribute values to the web browser correspondingly. The web browser provides received correspondence relationships between the attribute identifiers and the selectable attribute values to the user, i.e., displaying the correspondence relationships between the attribute identifiers and the selectable attribute values in the webpage. The user may select at least one attribute value from respective selectable attribute values for each preset attribute and then confirms submission thereof, thereby allowing the web browser to obtain the attribute value that has been selected by the user from the respective selectable attribute values of each preset attribute. The web browser sends correspondence relationships between the attribute identifiers of the preset attributes and the attribute values (that are selected from the respective selectable attribute values by the user) to the web server as the attribute information of the second product information which matches with the first product information.

In the fourth acquisition method, the web browser may, but not limited to, place the received correspondence relationships between the attribute identifiers and the attribute values in a pop-up window and present the pop-up window in the webpage.

In the third acquisition method and the fourth acquisition method, a method of determining whether the second product information that matches with first product information corresponding to the webpage is needed to be presented to the user by the web browser may include, but not limited to, the following two methods:

A first determination method: the webpage browser monitors a cursor position of the user in the webpage in real time. If detecting that the cursor position of the user in the webpage is located within a preset region, the web browser determines that the second product information which matches with first product information corresponding to the webpage is needed to be presented to the user.

A second determination method: the webpage provided by the web browser to the user includes a matched presentation button. If the user clicks on the matched presentation button (i.e., the web browser receiving a matching request of the user), the web browser determines that the second product information which matches with first product information corresponding to the webpage is needed to be presented to the user.

At block 13, the web server searches for second product information which satisfies the attribute information.

When searching for second product information, the web server searches for product information which attribute value of a preset attribute is the same as an attribute value of the preset attribute that is included in the obtained attribute information. An example of the obtained attribute information is shown in the following table.

| Preset attribute | Attribute value |
|---|---|
| Provider user attribute of product information | an attribute value indicating that "published product information and matched product information belong to a same provider user" |
| First level category attribute | Clothing |
| Second level category attribute | Women's clothing |
| Style tag | Korean version, western style |

When searching for the second product information, the web server first determines a provider user of the first product information, and then searches for product information which has an attribute value "clothing" of a first level category attribute in all product information published by the provider user. Within product information that is found, the web server searches for product information which has an attribute value "women's clothing" of a second level category attribute, and then searches for product information which has an attribute value "Korean version" or "Western style" of a style tag within found product information which has the attribute value "women's clothing" of the second level category attribute. Product information that is found by the web server at the end corresponds to the second product information that satisfies the attribute information.

At block 14, the web server sends the found second product information to the web browser used by the user.

For the first acquisition method and the second acquisition method, after finding the second product information that satisfies the attribute information, the web server includes the found second product information in the found webpage and sends the webpage to the web browser used by the user.

For the third acquisition method and the fourth acquisition method, after finding the second product information that satisfies the attribute information, the web server may directly send the found second product information to the web browser used by the user.

In the second embodiment of the present disclosure, the web server may send all pieces of the found second product information to the web browser, or select some pieces of the second product information from the found second product information to be sent to the web browser. Specifically, the web server first determines respective recommendation levels of all pieces of the found second product information, selects piece(s) of second product information having a recommendation level which satisfies a preset condition from among the found second product information, and sends the selected piece(s) of second product information to the web browser used by the user.

The above preset condition may include, but not limited to: a recommendation level of second product information to be not less than a specified threshold; or a predetermined number of first few pieces of second product information after arranging according to a descending order of respective recommendation levels.

In the second embodiment of the present disclosure, a method of determining a recommendation level of second product information may include, but not limited to, the following method: for each recommendation attribute of second product information, determining an attribute value of the second product information for that recommendation attribute, and determining a recommendation level of the second product information based on the attribute values.

For example, a recommendation attribute of second product information may include at least one of the following attributes: a sales volume attribute, a popularity attribute, a positive comment attribute, a provider user creditability attribute, a provider user violation attribute. After product information of the electronic commerce website is arranged in a descending order of respective sales volumes, an attribute value of the sales volume attribute is set to one if the second product information is ranked within the top N positions, and set to zero otherwise, where N is a preset value. After product information of the electronic commerce website is arranged in a descending order of respective popularity values, an attribute value of the popularity attribute is set to one if the second product information is ranked within the top N positions, and set to zero otherwise. An attribute value of the positive comment attribute is set as a percentage of positive comments of the second product information. An attribute value of the provider user creditability attribute is set as a creditability index of the provider user of the second product information. If a violation associated with the provider user of the second product information exists, an attribute value of the provider user violation attribute is set to zero. After determining the attribute values of the second product information for each recommendation attribute, the web server may add the determined attribute values together to obtain a sum, which is a recommendation level of the second product information.

At block 15, the web browser includes received pieces of second product information in the webpage for provision to the user.

In the second embodiment of the present disclosure, for the first acquisition method and the second acquisition method, the web server may, but not limited to, include the found second product information in the found webpage to be sent to the web browser that is used by the user, and the web browser may directly present the webpage that is sent from the webpage server. The webpage includes not only the first product information but also the second product information which matches with the first product information.

For the third acquisition method and the fourth acquisition method, after receiving the second product information from the web server, the web browser may, but not limited to, place the received second product information in a pop-up window and present the pop-up window in the webpage.

In the second embodiment of the present disclosure, upon finding the second product information, the web server may also search for a matching promotion rule that has previously been set by the provider user of the first product information in correspondence relationships between information identifiers and matching promotion rules, compute discount information when the user buys the first product information and the second product information at one time based on the matching promotion rule, and sends the computed discount information to the web browser. The web browser provides the discount information and the second product information to the user.

As can be seen from the above process, in the technical scheme of the embodiments of the present disclosure, after receiving a webpage access request of a user, the web server first obtains attribute information of second product information which matches with first product information corresponding to a webpage which the user requests to browse, searches for second product information which satisfies the attribute information, and sends found second product information to a web browser used by the user in order for the web browser to include the received second product information in the webpage for provision to the user. As can be seen from the above, when browsing product information of a certain product, if the user wants to browse product information of other products which match with the product, no manual search for product information of the other products which match with the product within the massive volume of product information of the electronic commerce website is needed. Rather, the product information is found and sent by the web server to the web browser. The web browser includes the found product information of the other products which match with the product in the webpage for provision to the user, thereby avoiding the user from repeatedly performing actions (such as searching, clicking, browsing, etc.) in the electronic commerce website, and effectively saving a relatively large amount of processing resources of the electronic commerce website.

In addition, since the user may browse other product information which matches with product information at the same time when browsing the product information using the web browser, the shopping experience of the user in the electronic commerce website may be improved.

Third Embodiment

Figure 2:
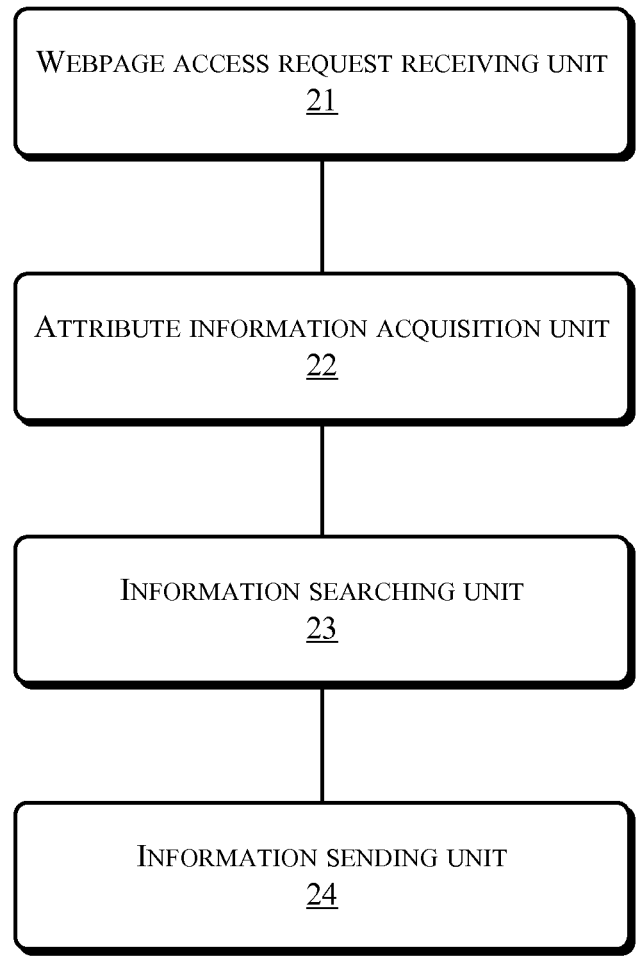
FIG. 2 is a structural diagram illustrating a web server in accordance with a third embodiment of the disclosure.

Corresponding to the method of providing information as described above, the third embodiment of the present disclosure provides a web server. A structure thereof, which is shown in FIG. 2, includes:

a webpage access request receiving unit 21 used for receiving a webpage access request of a user;

an attribute information acquisition unit 22 used for obtaining, after the webpage access request receiving unit 21 receives the webpage access request of the user, attribute information of second product information that matches with first product information corresponding to a webpage which the user requests to browse;

an information searching unit 23 used for searching for second product information that satisfies the attribute information obtained by the attribute information acquisition unit 22; and an information sending unit 24 used for sending second product information found by the information searching unit 23 to a web browser used by the user.

In one embodiment, the attribute information acquisition unit 22 may be used for searching for the attribute information of the second product information which matches with the first product information in pre-stored correspondence relationships between information identifiers and attribute information based on an information identifier of the first product information corresponding to the webpage which the user requests to browse.

In some embodiments, the web server further includes:

a user information acquisition unit used for obtaining user information of the user before the attribute information acquisition unit 22 searches for the attribute information of the second product information which matches with the first product information; and an instruction information determination unit used for determining whether the user information obtained by the user information acquisition unit includes an instruction for matched presentation;

the attribute information acquisition unit 22 used for performing the act of searching for the attribute information of the second product information which matches with the first product information if a determination result of the instruction information determination unit is affirmative.

In one embodiment, the web server further includes a first webpage searching unit used for searching for the webpage which the user request to browse before the information sending unit 24 sends the second product information found by the information searching unit 23 to the web browser used by the user;

the information sending unit 24 used for including the second product information found by the information searching unit 23 in the webpage found by the first webpage searching unit to be sent to the web browser used by the user.

In one embodiment, the web server further includes:

a second webpage searching unit for searching for the webpage which the user requests to browse before the attribute information acquisition unit 22 obtains the attribute information of the second product information which matches with the first product information corresponding to the webpage;

a webpage sending unit used for sending the webpage found by the second webpage searching unit to the web browser used by the user; and a matching request receiving unit used for receiving a matching request that includes an information identifier of the first product information from the web browser.

In some embodiments, the attribute information acquisition unit 22 may be used for searching for, after the matching request receiving unit receives the matching request from the web browser, the attribute information of the second product information which matches with the first product information in the pre-stored correspondence relationships between the information identifiers and the attribute information based on the information identifier included in the matching request.

In one embodiment, the attribute information acquisition unit 22 includes:

a selectable attribute value searching subunit used for searching for, after the matching request receiving unit receives the matching request from the web browser, attribute identifiers of the preset attributes and previously selected selectable attribute values of the second product information which matches with the first product information in pre-stored correspondence relationships among the information identifiers, the attribute identifiers of the preset attributes and selectable attribute values of the preset attributes based on the information identifier included in the matching request;

a selectable attribute value sending subunit used for sending the attribute identifiers and the selectable attribute values that are found by the selectable attribute value searching subunit to the web browser; and an attribute information receiving subunit used for receiving correspondence relationships between the attribute identifiers of the preset attributes and attribute values that are selected by the user from the web browser.

In one embodiment, the information sending unit 24 includes:

a recommendation level determination subunit used for determining respective recommendation levels corresponding to each piece of the second product information found by the information searching unit 23;

an information selection subunit used for selecting pieces of the second product information that have the respective recommendation levels determined by the recommendation level determination subunit to be satisfied with a preset condition from among each piece of the second product information found by the information searching unit 23; and an information sending subunit for sending the pieces of the second product information selected by the information selection subunit to the web browser used by the user.

Fourth Embodiment

Figure 3:
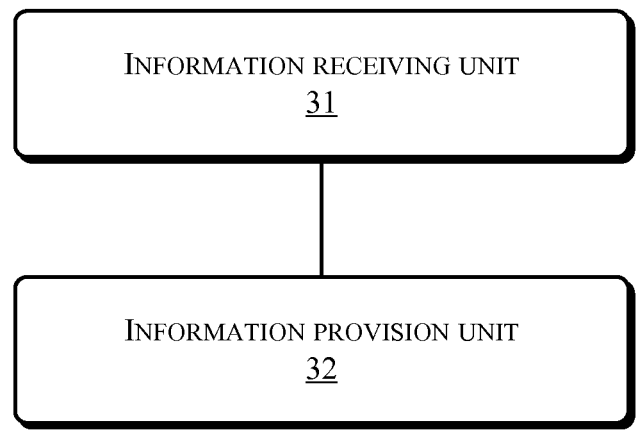
FIG. 3 is a structural diagram illustrating a web browser in accordance with a fourth embodiment of the disclosure.

Corresponding to the information provision method as described above, the fourth embodiment of the present disclosure provides a web browser. A structure thereof, which is shown in FIG. 3, includes:

an information receiving unit 31 used for receiving attribute information from a web server corresponding to a webpage which a user requests to browse, the attribute information being attribute information of second product information which matches with first product information corresponding to the webpage; and an information provision unit 32 used for including the second product information received by the information receiving unit 31 in the webpage for providing to the user.

In some embodiments, the information receiving unit 31 may be used for receiving a webpage including the attribute information that is sent by a web server and corresponds to the webpage which the user requests to browse;

the information provision unit 32 used for providing the webpage received by the information receiving unit to the user.

In one embodiment, the web browser further includes:

a webpage receiving unit used for receiving the webpage which the user requests to browse from the web server before the information receiving unit 31 receives the attribute information from the web server;

a webpage provision unit used for providing the webpage received by the webpage receiving unit to the user;

a display determination unit used for determining whether the second product information which matches with the first product information corresponding to the webpage is needed to be presented to the user;

a matching request sending unit used for including the information identifier of the first product information into a matching request to be sent to the web server when the display determination unit determines that the second product information which matches with the first product information corresponding to the webpage is needed to be presented to the user.

In some embodiments, the web browser further includes:

an attribute receiving subunit used for receiving attribute identifiers and corresponding selectable attribute values from the webpage server before the information receiving unit 31 receives the attribute information from the webpage server;

an attribute provision subunit used for providing correspondence relationships between the attribute identifiers and the selectable attribute values received by the attribute receiving subunit to the user;

an attribute acquisition subunit used for obtaining an attribute value that is selected by the user from respective selectable attribute values for each preset attribute; and an attribute sending subunit used for sending correspondence relationships between the attribute identifiers of the preset attributes and the attribute values selected by the user to the web server as the attribute information of the second product information which matches with the first product information.

In one embodiment, the display determination unit includes:

a position monitoring subunit user for monitoring a position of a user cursor in the webpage; and a first display determination subunit used for determining that the second product information which matches with first product information corresponding to the webpage is needed to be presented to the user when the position monitoring subunit detects that the position of the user cursor in the webpage is located within a preset region.

In some embodiments, the display determination unit includes:

a matching request receiving subunit used for receiving a matching request of the user; and a second display determination subunit used for determining that the second product information which matches with first product information corresponding to the webpage is needed to be presented to the user after the matching request receiving subunit receives the matching request of the user.

In one embodiment, the information provision unit 32 may be used for placing the second product information received by the information receiving unit 31 in a pop-up window and presents the pop-up window in the webpage.

A technical person skilled in the art should understand that the embodiments of the present disclosure may be implemented as methods, apparatuses (devices), or products of computer software. Therefore, the present disclosure may be implemented in forms of hardware, software, or a combination of hardware and software. Further, the present disclosure may be implemented in the form of products of computer software executable on one or more computer readable storage media (including but not limited to disk storage device, CD-ROM, optical storage device, etc.) that include computer readable program instructions.

The present disclosure is described in accordance with flowcharts and/or block diagrams of the exemplary methods, apparatuses (devices) and computer program products. It should be understood that each process and/or block and combinations of the processes and/or blocks of the flowcharts and/or the block diagrams may be implemented in the form of computer program instructions. Such computer program instructions may be provided to a general purpose computer, a special purpose computer, an embedded processor or another processing apparatus having a programmable data processing device to generate a machine, so that an apparatus having the functions indicated in one or more blocks described in one or more processes of the flowcharts and/or one or more blocks of the block diagrams may be implemented by executing the instructions by the computer or the other processing apparatus having programmable data processing device.

Such computer program instructions may also be stored in a computer readable memory device which may cause a computer or another programmable data processing apparatus to function in a specific manner, so that a manufacture including an instruction apparatus may be built based on the instructions stored in the computer readable memory device. That instruction device implements functions indicated by one or more processes of the flowcharts and/or one or more blocks of the block diagrams.

The computer program instructions may also be loaded into a computer or another programmable data processing apparatus, so that a series of operations may be executed by the computer or the other data processing apparatus to generate computer implemented processing. Therefore, the instructions executed by the computer or the other programmable apparatus may be used to implement one or more processes of the flowcharts and/or one or more blocks of the block diagrams.

Figure 4:
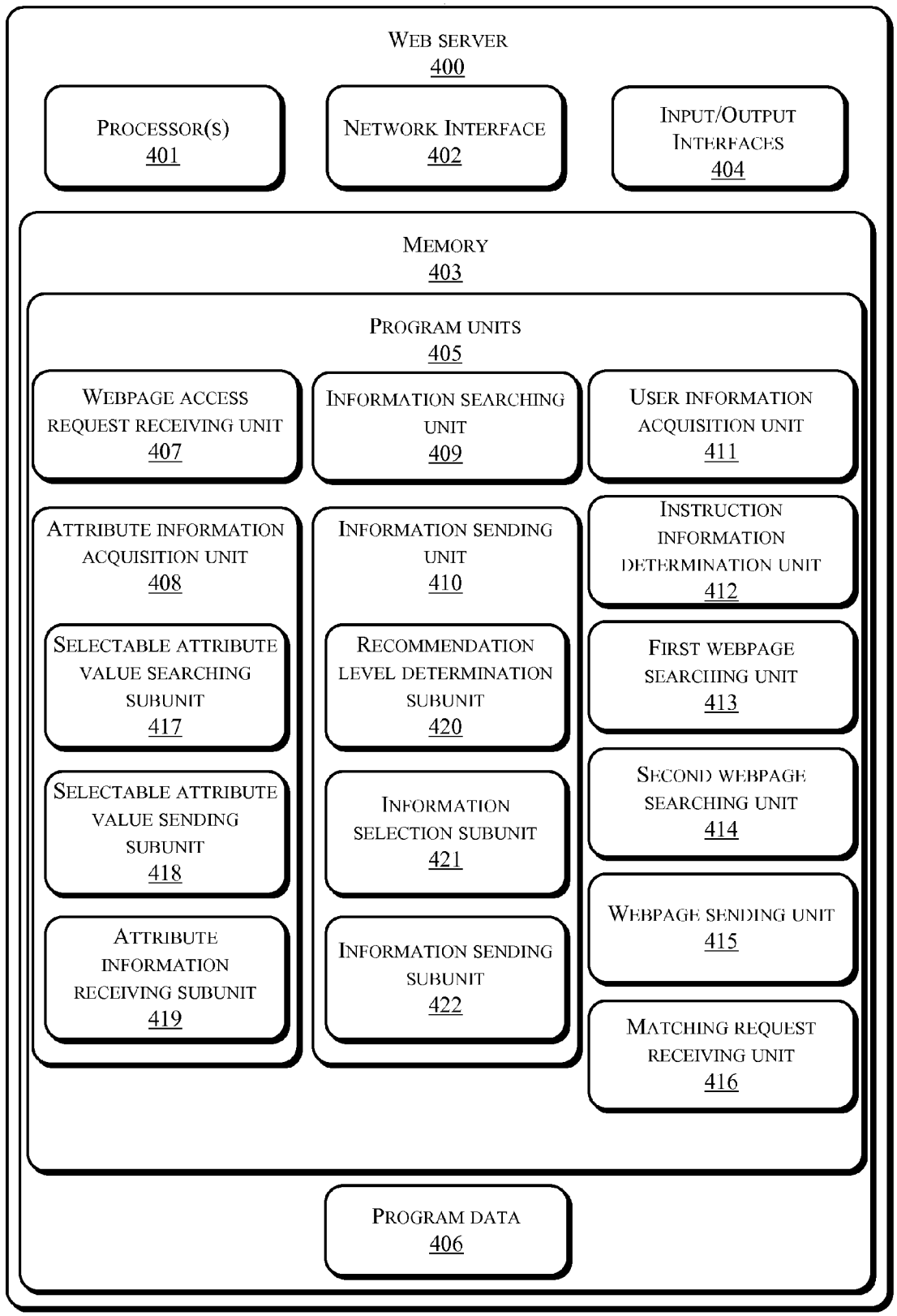
FIG. 4 is a structural diagram illustrating the example web server as described in FIG. 2.

For example, FIG. 4 illustrates an exemplary web server 400, such as the web server as described above, in more detail. In one embodiment, the web server 400 can include, but is not limited to, one or more processors 401, a network interface 402, memory 403, and an input/output interface 404.

The memory 403 may include computer-readable media in the form of volatile memory, such as random-access memory (RAM) and/or non-volatile memory, such as read only memory (ROM) or flash RAM. The memory 403 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 403 may include program units 405 and program data 406. In one embodiment, the program units 405 may include a webpage access request receiving unit 407, an attribute information acquisition unit 408, an information searching unit 409 and an information sending unit 410. Additionally, in some embodiments, the program units 405 may further include a user information acquisition unit 411, an instruction information determination unit 412, a first webpage searching unit 413, a second webpage searching unit 414, a webpage sending unit 415 and/or a matching request receiving unit 416. In one embodiment, the attribute information acquisition unit 408 may include a selectable attribute value searching subunit 417, a selectable attribute value sending subunit 418 and an attribute information receiving subunit 419. In some embodiments, the information sending unit 410 may include a recommendation level determination subunit 420, an information selection subunit 421 and an information sending subunit 422. Details about these program units and any sub-units and/or modules thereof may be found in the foregoing embodiments described above.

Although exemplary embodiments of the present disclosure are provided, a technical person skilled in the art may change and modify theses exemplary embodiments upon understanding the underlying inventive concepts thereof. Therefore, claims attached herein are intended to cover the exemplary embodiments and all the changes and modifications that fall into the scope of the present disclosure. Apparently, a technical person skilled in the art may make changes and modifications of the present application without departing from the spirit and scope of the present disclosure. If these changes and modifications are within the scope of the claims and their equivalents of the present disclosure, the present disclosure intends to covers such changes and modifications.

The invention claimed is:

1. A method of providing information, comprising:
    in response to receiving a webpage access request of a user, obtaining, by a web server, attribute information of second product information that matches first product information corresponding to a webpage which the user requests to browse, wherein prior to obtaining attribute information from the web server, a provider computer receives attribute identifiers and corresponding selectable attribute values from the web server for providing attribute information of the second product information;
    obtaining second product information which satisfies the attribute information; and
    sending, by the web server, the webpage including the obtained second product information to a web browser used by the user, the sending comprising:
        including the obtained second product information into the obtained webpage to be sent to the web browser used by the user.

2. The method according to claim 1, wherein obtaining the attribute information of the second product information comprises:
    searching for the attribute information of the second product information which matches the first product information in pre-stored correspondence relationships between information identifiers and attribute information based on an information identifier of the first product information.

3. The method according to claim 2, further comprising:
    prior to searching for the attribute information of the second product information which matches the first product information,
    obtaining user information of the user by the web server; and
    determining whether the obtained user information includes an instruction for matched presentation; and
    if a determination result is affirmative, the web server searching for the attribute information of the second product information which matches the first product information.

4. The method according to claim 2, further comprising:
    prior to sending the obtained second product information to the web browser used by the user, searching, by the web server, the webpage which the user requests to browse.

5. The method according to claim 1, further comprising:
    prior to obtaining the attribute information of the second product information,
        searching the webpage which the user requests to browse; and
        sending the webpage to the web browser used by the user.

6. The method according to claim 5, wherein obtaining the attribute information of the second product information comprises:
    receiving a matching request from the web browser; and
    searching for the attribute information of the second product information which matches the first product information in pre-stored correspondence relationships between information identifiers and attribute information based on the information identifier included in the matching request.

7. The method according to claim 5, wherein obtaining the attribute information of the second product information comprises:
    receiving a matching request from the web browser;
    searching for attribute identifiers of preset attributes and previously selected selectable
    attribute values for the second product information which matches the first product information in pre-stored correspondence relationships among information identifiers, the attribute identifiers of the preset attributes and the selectable attribute values of the preset attributes being based on the information identifier included in the matching request; and
    sending the attribute identifiers and the selectable attribute values to the web browser.

8. The method according to claim 5, wherein sending the obtained second product information to the web browser used by the user comprises:
    separately determining, by the web server, respective recommendation levels corresponding to each piece of the obtained second product information;
    selecting a piece of the second product information having a recommendation level which satisfies a preset condition from each piece of the obtained second product information; and
    sending, by the web server, the selected piece of second product information to the web browser used by the user.

9. The method according to claim 8, wherein the preset condition comprises:
    a piece of second product information having a recommendation level not less than a specified threshold; or
    a predetermined number of first N of pieces of second product information after arranging thereof in accordance with a descending order of respective recommendation levels.

10. A web server comprising:
    a webpage access request receiving unit used for receiving a webpage access request of a user;
    an attribute information acquisition unit used for obtaining from a provider computer, after the webpage access request receiving unit receives the webpage access request of the user, attribute information of second product information that matches first product information corresponding to a webpage which the user requests to browse, wherein prior to obtaining attribute information, the provider computer receives attribute identifiers and corresponding selectable attribute value values for providing attribute information of the second product information;
    an information searching unit used for obtaining second product information that satisfies the attribute information obtained by the attribute information acquisition unit; and
    an information sending unit used for sending the second product information obtained by the information searching unit to a web browser used by the user and for including the second product information obtained by the information searching unit into the webpage that the user has requested to browse.

11. The web server according to claim 10, wherein the attribute information acquisition unit is further used for searching for the attribute information of the second product information which matches the first product information in pre-stored correspondence relationships between information identifiers and attribute information based on an information identifier of the first product information corresponding to the webpage which the user requests to browse.

12. The web server according to claim 10, further comprising:
a user information acquisition unit used for obtaining user information of the user before the attribute information acquisition unit searches for the attribute information of the second product information which matches the first product information; and
an instruction information determination unit used for determining whether the user information obtained by the user information acquisition unit includes an instruction for matched presentation;
the attribute information acquisition unit used for performing the act of searching for the attribute information of the second product information which matches the first product information if a determination result of the instruction information determination unit is affirmative.

13. The web server according to claim 10, further comprising a first webpage searching unit used for searching for the webpage which the user requests to browse before the information sending unit sends the second product information obtained by the information searching unit to the web browser used by the user.

14. The web server according to claim 10, further comprising:
a second webpage searching unit for obtaining the webpage which the user requests to browse before the attribute information acquisition unit obtains the attribute information of the second product information which matches the first product information corresponding to the webpage;
a webpage sending unit used for sending the webpage obtained by the second webpage searching unit to the web browser used by the user; and
a matching request receiving unit used for receiving a matching request that includes an information identifier of the first product information from the web browser.

15. The web server according to claim 14, wherein after the matching request receiving unit receives the matching request from the web browser the attribute information acquisition unit is further used for obtaining the attribute information of the second product information which matches the first product information in the pre-stored correspondence relationships between the information identifiers and the attribute information based on the information identifier included in the matching request.

16. The web server according to claim 14, wherein the attribute information acquisition unit includes:
a selectable attribute value searching subunit used for obtaining, after the matching request receiving unit receives the matching request from the web browser, attribute identifiers of the preset attributes and previously selected selectable attribute values of the second product information which matches the first product information in pre-stored correspondence relationships among the information identifiers, the attribute identifiers of the preset attributes and selectable attribute values of the preset attributes being based on the information identifier included in the matching request;
a selectable attribute value sending subunit used for sending the attribute identifiers and the selectable attribute values that are found by the selectable attribute value searching subunit to the web browser; and
an attribute information receiving subunit used for receiving correspondence relationships between the attribute identifiers of the preset attributes and attribute values that are selected by the user from the web browser.

17. The web server according to claim 10, wherein the information sending unit includes:
a recommendation level determination subunit used for determining respective recommendation levels corresponding to each piece of the second product information obtained by the information searching unit;
an information selection subunit used for selecting pieces of the second product information that have the respective recommendation levels determined by the recommendation level determination subunit to be satisfied with a preset condition from among each piece of the second product information obtained by the information searching unit; and
an information sending subunit for sending the pieces of the second product information selected by the information selection subunit to the web browser used by the user.

18. A system comprising:
one or more processors;
a memory device communicatively coupled with the one or more processors;
an information receiving unit used for receiving attribute information from a web server corresponding to a webpage which a user requests to browse, the attribute information including attribute information of second product information which matches first product information corresponding to the webpage;
an attribute information receiving unit used for receiving attribute identifiers and corresponding selectable attribute values from the web server before the information receiving unit receives the attribute information from the web server for providing attribute information of the second product information; and
an information provision unit used for providing the second product information received by the information receiving unit, whereby the web server includes the second product information into the webpage which the user has requested to browse.

19. The system according to claim 18, further comprising:
a webpage receiving unit used for receiving the webpage which the user requests to browse from the web server before the information receiving unit receives the attribute information from the web server;
a webpage provision unit used for providing the webpage received by the webpage receiving unit to the user;
a display determination unit used for determining whether the second product information which matches the first product information corresponding to the webpage is needed to be presented to the user; and
a matching request sending unit used for including the information identifier of the first product information into a matching request to be sent to the web server when the display determination unit determines that the second product information which matches the first product information corresponding to the webpage is needed to be presented to the user.

20. The system according to claim 18, further comprising:
- an attribute provision subunit used for providing correspondence relationships between the attribute identifiers and the selectable attribute values received by the attribute receiving subunit to the user;
- an attribute acquisition subunit used for obtaining an attribute value that is selected by the user from respective selectable attribute values for each preset attribute; and
- an attribute sending subunit used for sending correspondence relationships between the attribute identifiers of the preset attributes and the attribute values selected by the user to the web server as the attribute information of the second product information which matches the first product information.

* * * * *